United States Patent [19]

LeCun

[11] Patent Number: 5,774,586
[45] Date of Patent: Jun. 30, 1998

[54] METHOD AND APPARATUS FOR STANDARDIZATION OF INPUTS TO WORD RECOGNITION SYSTEMS

[75] Inventor: Yann Andre LeCun, Lincroft, N.J.

[73] Assignee: NCR Corporation, Dayton, Ohio

[21] Appl. No.: 237,813

[22] Filed: May 4, 1994

[51] Int. Cl.[6] ................................. G06K 9/80; G06T 3/00
[52] U.S. Cl. ............................ 382/215; 382/200; 382/229
[58] Field of Search ....................................... 382/193, 194,
382/200, 197, 198, 191, 159, 160, 161,
168, 289, 290, 291, 292, 186, 187, 188,
189, 174, 176, 179, 296, 301, 119, 123,
215, 229

[56] References Cited

U.S. PATENT DOCUMENTS

| | | | |
|---|---|---|---|
| 3,133,266 | 5/1964 | Frishkopf | 340/146.3 |
| 3,829,831 | 8/1974 | Yamamoto et al. | 340/146.3 AQ |
| 4,284,975 | 8/1981 | Odaka | 340/146.3 J |
| 4,317,109 | 2/1982 | Odaka et al. | 340/146.3 AC |
| 4,556,985 | 12/1985 | Hongo | 382/30 |
| 4,561,105 | 12/1985 | Crane et al. | 382/13 |
| 4,727,588 | 2/1988 | Fox et al. | 382/189 |
| 4,731,857 | 3/1988 | Tappert | 382/9 |
| 4,799,270 | 1/1989 | Kim et al. | 382/27 |
| 4,803,736 | 2/1989 | Grossberg et al. | 382/22 |
| 4,888,814 | 12/1989 | Yamaguchi et al. | 382/21 |
| 5,005,205 | 4/1991 | Ellozy et al. | 382/3 |
| 5,029,223 | 7/1991 | Fujisaki | 382/13 |
| 5,058,179 | 10/1991 | Denker et al. | 382/14 |
| 5,058,182 | 10/1991 | Kuan et al. | 382/25 |
| 5,062,141 | 10/1991 | Nakayama et al. | 382/9 |
| 5,067,164 | 11/1991 | Denker et al. | 382/15 |
| 5,091,976 | 2/1992 | Murayama | 382/242 |
| 5,093,803 | 3/1992 | Howard et al. | 364/807 |
| 5,105,468 | 4/1992 | Guyon et al. | 382/14 |
| 5,121,441 | 6/1992 | Chefalas et al. | 382/13 |
| 5,155,801 | 10/1992 | Lincoln | 395/22 |
| 5,212,739 | 5/1993 | Johnson | 382/9 |
| 5,309,521 | 5/1994 | Matsukawa | 382/242 |

FOREIGN PATENT DOCUMENTS

| | | | |
|---|---|---|---|
| 2 071 386 | 9/1981 | United Kingdom | G09G 3/04 |
| WO-A-91/ 11779 | 8/1991 | WIPO | G06K 9/03 |

OTHER PUBLICATIONS

European Search Report dated Aug. 18, 1995, regarding EPO Application No. EP 95302817.2.

Primary Examiner—Michael T. Razavi
Assistant Examiner—Larry J. Prikockis
Attorney, Agent, or Firm—Christopher N. Malvone

[57] ABSTRACT

Groups of symbols to be recognized are standardized by fitting four flexible curves to the group of symbols. The curves are fitted by minimizing a cost or energy function that associates a cost with the curvature of the curves, the slant of the curves, the displacement in spacing between the curves and the distance of maxima and minima points from the curves. After the curves are fitted to the group of symbols, the symbols are standardized by transforming coordinates systems so that the fitted curves are placed in a predetermined configuration.

13 Claims, 8 Drawing Sheets

FIG. 1

PRIOR ART

FIG. 2

PRIOR ART

METHOD AND APPARATUS FOR STANDARDIZATION OF INPUTS TO WORD RECOGNITION SYSTEMS

CROSS-REFERENCE TO RELATED APPLICATION

This application is related to copending commonly assigned applications "A Method And Apparatus For Symbol Recognition Using Multidimensional Preprocessing", Ser. No. 07/959846; "A Method And Apparatus For Symbol Recognition Using Multidimensional Preprocessing And Symbol Sorting", Ser. No. 07/959874; and "Method And Apparatus For Symbol Recognition Using Multidimensional Preprocessing At Multiple Resolutions", Ser. No. 07/959895, now U.S. Pat. No. 5,337,372, issued Aug. 9, 1994.

BACKGROUND OF THE INVENTION

1. Field of the Invention

The present invention relates to word recognition; in particular, the standardization of inputs to recognition systems.

2. Description of the Related Art

A critical aspect of word recognition is determining character size and position with respect to a baseline, and the presence of ascenders and descenders. The relative size and position of a character are used to determine the amount of scaling and positioning that must be done to standardize an input to a recognition system and to distinguish the difference between similarly shaped characters that are different in size, for example, distinguishing between an upper and lower case "O".

Figure 1:
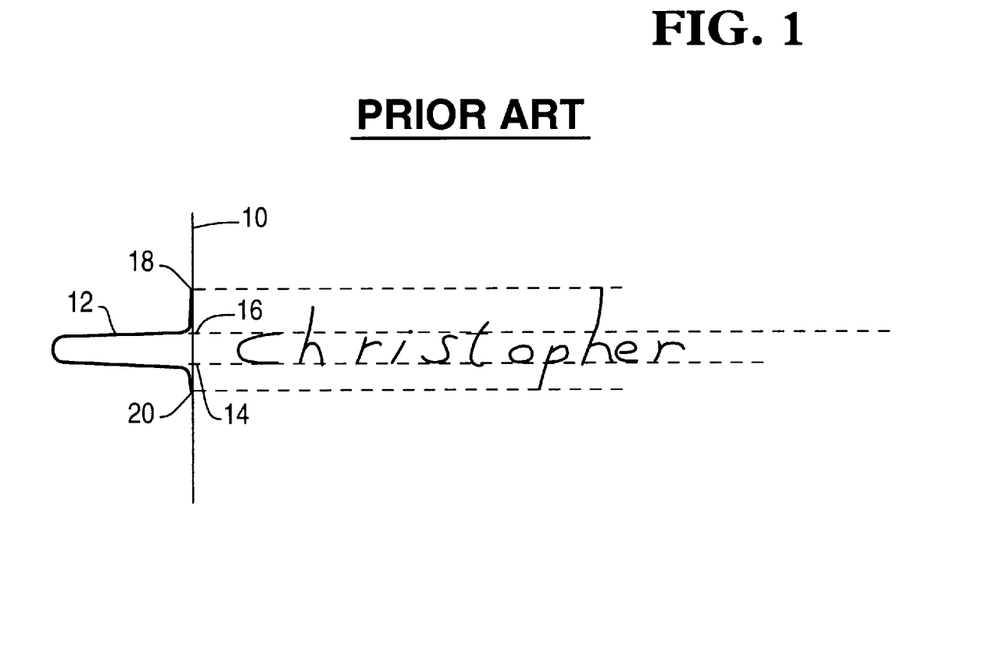
FIG. 1 illustrates a horizontal projection of a word written along a straight path.
Figure 2:
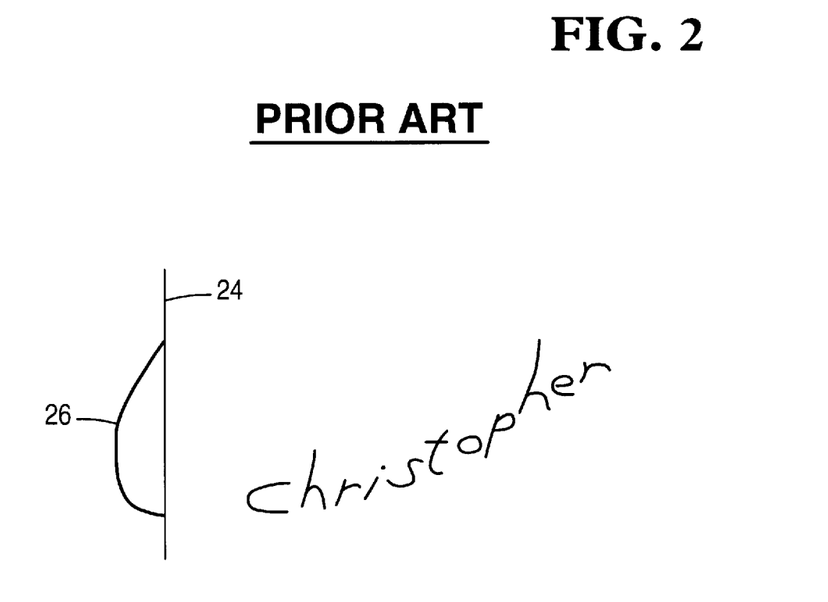
FIG. 2 illustrates a horizontal projection of a word written along a curved path.

In reference to FIG. 1, the sum of the pixels or points composing a word are projected onto line 10 which is perpendicular to the general orientation of the word. That projection results in curve 12 which is used to determine base level 14, core level 16, ascender level 18 and descender level 20. The shape of curve 12, in the case of a word that is written on a relatively straight line, permits location of these points; however, when a word is written along a curve trajectory or has widely varying character sizes, curve 12 does not permit easy location of the aforementioned levels. FIG. 2 illustrates such a situation. The horizontal projection of the pixels or points of the word of FIG. 2 onto line 24 results in curve 26. The shape of curve 26 does not facilitate location of the base, core, ascender or descender levels. As a result, recognition systems that use the horizontal projection technique are unable to determine these levels, and thereby, have difficulty standardizing and/or distinguishing between upper and lower case characters.

SUMMARY OF THE INVENTION

An embodiment of the present invention determines a base line level, a core line level, an ascender line level and a descender line level using flexible curves that are fitted to the pixels or points composing a word using elastic matching. Two upper flexible curves, which are the core level and ascender lines, are fitted to the word using maxima points of the word, and two lower flexible lines, which are the base level and descender lines, are fitted to the word using minima points of the word. The lines are fitted to these points by minimizing a cost or energy function. The cost function associates a cost with the distance between maxima points and the two upper curves, the distance between minima points and the two lower curves, the curvature of the lines, the slant of the lines, and the displacement in spacing between the lines. The word is standardized by transforming the coordinate system so that the fitted curves are placed in a predetermined configuration. Fitting flexible curves to a word permits standardization and distinguishing between upper and lower case letters where past systems were unable to perform such functions.

DETAILED DESCRIPTION

Figure 3:
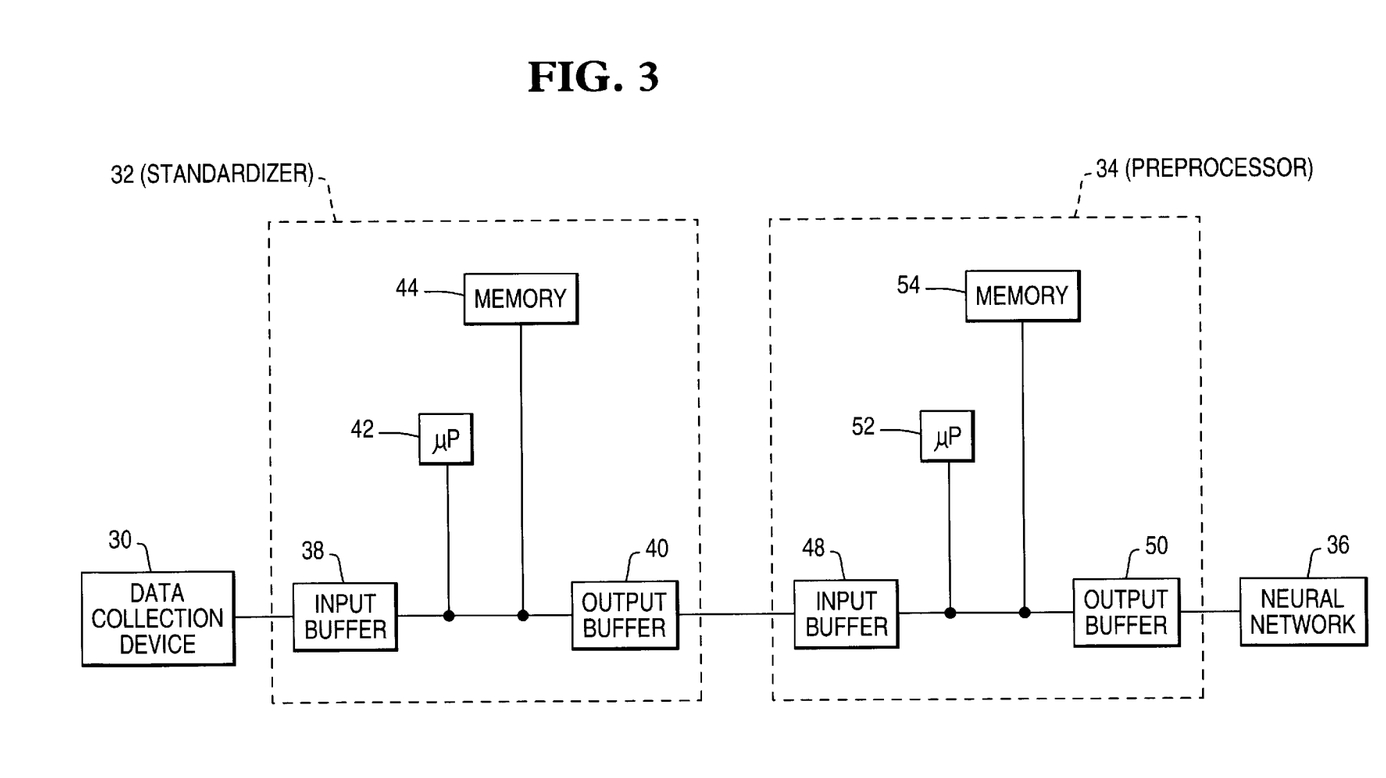
FIG. 3 is a block diagram of a word or symbol recognition system.

FIG. 3 is a block diagram of a word or symbol recognition system. Data collection device 30 provides data that describes the word, group of symbols, symbol, or character to standardizer 32. Standardizer 32 standardizes the size and orientation of the word, group of symbols or symbol to be recognized, and provides the standardized word, group of symbols or symbol to preprocessor 34. Preprocessor 34 maps the word, group of symbols or symbol to be identified into an array, assigns values to the cells that compose the array and provides the values of the cells to neural network 36. Neural network 36, which has been trained to identify or recognize the words or symbols in the word or symbol set of interest, identifies the word or symbols in question using the information provided by preprocessor 34.

Data collection device 30 may be implemented using a pad with an electronic pen, a terminal with a touch sensitive screen, an optical character reader, a device that scans symbols using an electromagnetic wave, a camera, or any other type of device, data source or communication link that provides data describing the symbol to be identified. In the case of an optical character reader, it may be necessary to skeletonize the symbol at some point in the preprocessing. Data collection device 30 may be a GRiD PAD from GRiD Systems Corporation, a Toshiba Pen PC from Toshiba America Information Systems, Inc., or another apparatus that collects data describing a symbol to be identified.

Standardizer 32 comprises input buffer 38, output buffer 40, microprocessor 42 and memory 44. Input buffer 38 receives the data describing the word or symbols from data collection device 30 and stores that data for use by microprocessor 42. Input buffer 38 can be constructed using a Random Access Memory (RAM), a First-In-First-Out (FIFO) memory, registers, magnetic disks, optical disks, or any other memory device. Microprocessor 42 executes instructions stored in memory 44. Microprocessor 42 transforms the points or pixels composing the word or symbols to be recognized so that the size and orientation of the word or symbols is standardized. Microprocessor 42 can be any computing device such as a microcomputer, PC, mainframe or specialized hardware. The transformed points describing the standardized word or symbols are placed in output buffer 40. Output buffer 40 provides the transformed points to the input of preprocessor 34. Output buffer 40 can be constructed using memory devices similar to those used to implement input buffer 38.

Preprocessor 34 is similar in structure to standardizer 32, and comprises input buffer 48, output buffer 50, microprocessor 52 and memory 54. Input buffer 48 receives the data describing the standardized word or symbols from standardizer 32 and stores that data for use by microprocessor 52. Input buffer 48 can be constructed using a Random Access Memory (RAM), a First-In-First-Out (FIFO) memory, registers, magnetic disks, optical disks, or any other memory device. Microprocessor 52 executes instructions stored in memory 54. Microprocessor 52 maps the symbol to be identified into an array which quantifies the features of the micro-segments composing the symbol, and assigns values to the cells of the array. Microprocessor 52 can be any computing device such as a microcomputer, PC, mainframe or specialized hardware. The values of the cells are placed in output buffer 50. Output buffer 50 provides the cell values to the inputs of neural network 36. Output buffer 50 can be constructed using memory devices similar to those used to implement input buffer 48. It should be noted that the above described embodiments of preprocessor 34 and standardizer 32 are similar and may be implemented using one high speed processor with the appropriate memory, input buffer and output buffer.

Neural network 36 can be fabricated using analog or digital circuitry. If neural network 36 is analog in nature, output buffer 50 may be constructed using a D/A converter and a plurality of sample and hold devices that sample at the appropriate time. The sample and hold devices may be integrated circuits or capacitors. It should be noted that it is also possible to implement neural network 36 and/or preprocessor 34 and/or standardizer 32 as a program within a computer. For example, the standardizer, preprocessor and neural network can be implemented on a SUN workstation or an AT&T 6386 PC. Neural network 36 may be replaced with another type of classifier such as associative memories, linear classifiers, polynomial classifiers, nearest neighbor classifiers, or vector quantizers.

Figure 4:
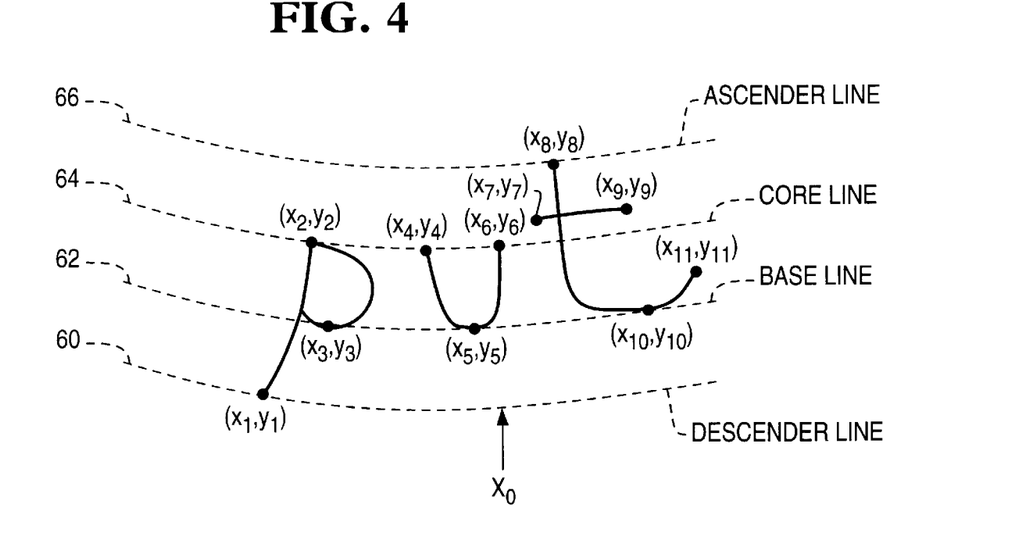
FIG. 4 illustrates descender, base, core and ascender curves or lines fitted to a word.

In reference to FIG. 4, the word "put" has been written along a curved path and descender line 60, base line 62, core line 64, and ascender line 66 have been fitted to the word. The lines have been fitted by examining minima points $(X_1, Y_1), (X_3, Y_3), (X_5, Y_5), (X_7, Y_7)$ and $(X_{10}, Y_{10})$, and maxima points $(X_2, Y_2), (X_4, Y_4), (X_6, Y_6), (X_8, Y_8), (X_9, Y_9)$ and $(X_{11}, Y_{11})$. Minima points are defined as the points where the adjacent points or pixels are higher, and maxima points are defined as points where the adjacent points or pixels are lower.

In applications involving on-line recognition, that is, where inputs are directly written onto a tablet screen, the input is smoothed before determining minima and maxima points. Input smoothing is well known in the art and is disclosed in "The State of the Art in On-line Handwriting Recognition" by Tappert, Suen and Wakahara, IEEE transactions P.A.M.I., vol. 12, No. 8,1990.

In the case of images provided by instruments such as a scanner or camera, the upper and lower profiles of the image are determined and then the maxima and minima points are extracted from those profiles. Methods for determining these profiles are well-known in the art.

Figure 5:
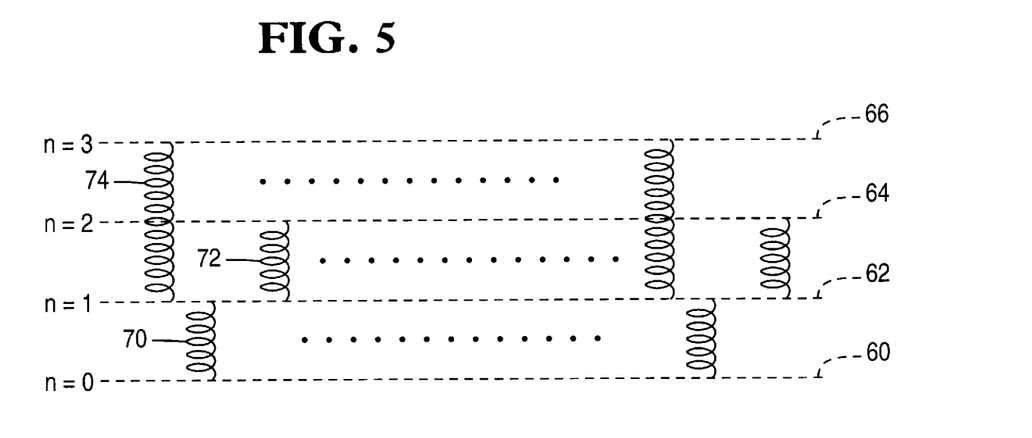
FIG. 5 illustrates a mechanical analogy of the descender, base, core and ascender lines.

FIG. 5 illustrates a mechanical analogy that may be used in defining the relationship between lines 60, 62, 64 and 66. The lines are viewed as flexible rods with groups of springs 70, 72 and 74 interconnecting lines 60, 64 and 66, respectively, to line 62 along their entire lengths. The lines are all parallel with the same curvature. They may also be viewed as parabolas of the following form.

$$y = f_n(x) = K(x-X_0)^2 + S(x-X_0) + Y_{0n}; \qquad (1)$$

where n=0–3 for lines 60, 62, 64 and 66, respectively.

It should be noted that the parameters, K, $X_0$ and S are shared for all four lines and the parameter $Y_{0n}$ is different for each line. The parameter K controls curvature, the S parameter is the slant and $(X_0, Y_{0n})$ is a translation vector. Each curve has its own vertical translation $Y_{0n}$. The reference $X_0$ is computed as the horizontal center of mass using all of the points composing the word.

$$X_0 = \frac{1}{p} \sum_{i=1}^{p} x_i,$$

where i=1... p and $x_i$ are the x coordinates (the abscissa) of all p points composing the word. In the case of FIG. 4's "put", the approximate location of $X_0$ is shown under the character "U".

Figure 7:
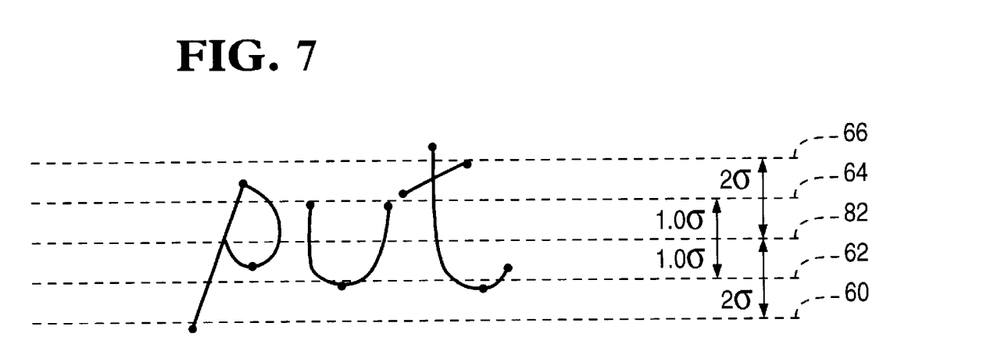
FIG. 7 illustrates descender, base, core and ascender lines before fitting.

The lines are fitted to the word by minimizing an energy or cost function in the form of Equation 2.

$$E(K, S, Y_{00}, Y_{01}, Y_{02}, Y_{03}) = \sum_i -\ln[\omega_2 N_2 e^{-s2(y_i - f2(x_i))^2} + \qquad (2)$$

maxima $$\omega_3 N_3 e^{-s3(y_i - f3(x_i))^2} + \omega_4 P_b] + \sum_i -\ln[\omega_0 N_0 e^{-s0(y_i - f0(x_i))^2} +$$

minima $$\omega_1 N_1 e^{-s1(y_i - f1(x_i))^2} + \omega_4 P_b] + C_k K^2 + C_s S^2 +$$

$$C_0(Y_{00} - Y_{01} - d_0)^2 + C_1(Y_{01} - d_1)^2 +$$

$$C_2(Y_{02} - Y_{01} - d_2)^2 + C_3(Y_{03} - Y_{01} - d_3)^2$$

where $$N_k = \sqrt{\frac{s_k}{\pi}}$$

and where $C_0=250$, $C_1=1250$, $C_2=250$, $C_3=555$, $C_k=5000$, $C_s=5000$, $\omega_0=0.05$, $\omega_1=0.85$, $\omega_3=0.05$, $\omega_4 P_b=0.1$, $s_0=2$, $s_1=2$, $s_2=2$ and $s_3=2$. The values for $d_0$–$d_3$, which are the rest lengths of the springs, will be discussed below in reference to FIG. 7. It is desirable to use these values for the constants of Equation 2 when the coordinate system has been normalized using $$x_{i\,new} \leftarrow \frac{x_{i\,old}}{y_0} \quad ; y_{i\,new} \leftarrow \frac{y_{i\,old} - v_i}{y_0}$$

where $$v_i = Tx_i + y_c$$

which defines a straight line that is fitted to the word so as to minimize the average square vertical distance between the points composing the word and the straight fitted line. This may be performed using standard linear fitting techniques. In addition, $$y_0 = \sqrt{\frac{1}{p} \sum_{i=1}^{p} (v_i - y_i)^2}$$

where i=1... p, where $v_i$ are the ordinates of the straight fitted line and where $y_i$ are the ordinates of all the p points composing the word.

The energy function of equation 2 comprises a first set of summation terms that represent the quality of the fit between the data and lines 60, 62, 64 and 66, where an increased energy or cost is associated with a poor fit. The function also comprises a second set of terms that indicate the energy required to bend and move the lines in order to fit the data. Bending the lines involves an energy or cost associated with overcoming a stiffness associated with the lines; the $C_k K^2$ term represents the bending energy or cost. Recalling the springs of FIG. 5, an energy or cost is associated with a displacement of the spacing between the lines; the $C_0$–$C_3$ terms represent the displacement energy or cost. An energy or cost is also associated with the slant of the lines; the $C_s S^2$ term represents the slant energy or cost. The energy function is then minimized to get the best fit of the lines while minimizing the curvature of the lines, the displacement in spacing between the lines and the slant of the lines. Once the lines are defined in this manner, the word can be standardized by transforming the coordinate system so that the fitted lines are at predefined positions. This also makes it possible to distinguish between upper and lower case characters by examining whether the top of the character is substantially above line 64, for example it may be closer to line 66 than line 64.

As mentioned earlier, the two summation terms of Equation 2 are related to the quality of the fit between the lines and the data, and represent the energy or cost associated with a point's distance from the lines. The first summation represents the energy associated with a maxima point's distance from lines 64 and 66 (recall Equation 1 and that n=0–3 for lines 60, 62, 64 and 66 respectively). The second summation represents the energy associated with a minima point's distance from lines 60 and 62. It should be noted that in each of the summation terms there is an energy associated with $\omega_4 P_b$. This represents a background energy which prevents the $-\ln$ term in each summation from growing unbounded as the distance between a point and a line increases. This term has the effect of putting a limit on the cost of an "outlier", that is, the cost associated with a point that does not fit any of the lines. For example, the cross of the "T" as shown by points $(X_7, Y_7)$ and $(X_9, Y_9)$ of FIG. 4 are "outliers".

With regard to the four line model, it is possible to associate a maximum with one of two lines and a minimum with one of two lines. A maximum may be associated with line 64 or 66 and a minimum may be associated with line 60 or 62. It is desirable to associate minimal energy or cost with a point that is on a line, and increasing energy with a point as the distance between the point and a line increases. In this embodiment, the function describing the energy associated with a point's distance from either of the lines is chosen to be the negative log likelihood of the mixture of two Gaussians where each of the Gaussians has its mean on one of the lines, where the Gaussians may have different standard deviations and where the mixture coefficients can be used to increase the likelihood that the points will cluster around a particular line.

Figure 6:
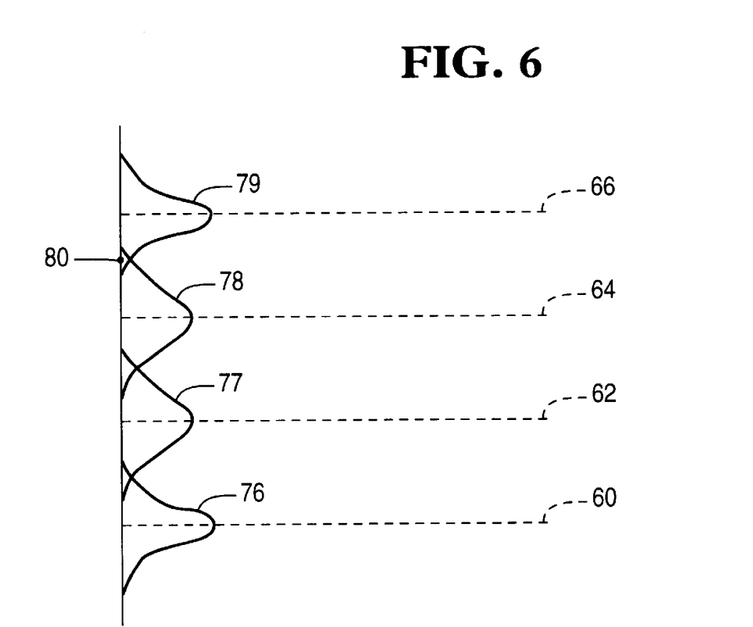
FIG. 6 illustrates Gaussian probability functions.

FIG. 6 illustrates the Gaussian probability functions discussed above. Each of lines 60, 62, 64 and 66 have Gaussian distributions 76, 77, 78 and 79, respectively. The Gaussian distributions are used to assign the energy associated with a point based on the point's distance from a line. In the case of a maxima point, the energy associated with the point is a function of its distance from lines 64 and 66, and in the case of a minima point, the energy associated with the point is based on its distance from lines 60 and 62. For example, point 80 is a maxima point whose energy is defined using Gaussians 78 and 79. The energy associated with point 80 is based on the negative log of the weighted sum of the values obtained from Gaussians 78 and 79. For minima points the same type of calculation is carried out with regard to Gaussians 76 and 77. In addition, each maxima and minima point has a a background energy or cost associated with the $\omega_4 P_b$ term of Equation 2.

The energy represented by Equation 2 should be minimized with respect to the variables K, S, $Y_{00}$, $Y_{01}$, $Y_{02}$ and $Y_{03}$. This can be accomplished through a variety of techniques such as gradient descent or other known nonlinear minimization techniques; however, it is desirable to use the expectation maximization (EM) procedure which is widely used in statistics and described in "Maximum Likelihood from Incomplete Data via the EM Algorithm", Dempster, Laird and Rubin, Proceeding of the Royal Statistical Society, pp. 1–38, vol. B–39, 1977.

The EM technique can be carried out by introducing an auxiliary energy function Q which depends upon the original parameters K, S, $Y_{00}$, $Y_{01}$, $Y_{02}$, $Y_{03}$, and upon a set of auxiliary random variables $Z_{ik}$ whose distributions depend on the original parameters. The variables $Z_{ik}$ are chosen in such a way that, if their distributions are kept constant, the minimization of the expected value of Q averaged over the distribution of $Z_{ik}$, reduces to a trivial (or simple) problem. The algorithm proceeds by first computing the distribution of $Z_{ik}$ given the current parameter values (expectation step), then by finding the parameter values that minimize the expected value of Q averaged over the distribution of $Z_{ik}$ (the minimization step), and by iterating the above two steps. Q is designed so that the parameter values obtained after convergence of the above process is a local minimum of the original energy function E.

The function Q is identical to E (Equation 2), except that each term in the mixtures is multiplied by the corresponding $Z_{ik}$.

$$Q(K, S, Y_{00}, Y_{01}, Y_{02}, Y_{03}) = \sum_i \quad -\ln[Z_{i2}\omega_2 N_2 e^{-s2(y_i - f2(x_i))^2} +$$

maxima $$Z_{i3}\omega_3 N_3 e^{-s3(y_i - f3(x_i))^2} + Z_{i4}\omega_4 P_b] + \sum_i \quad -\ln[Z_{i0}\omega_0 N_0 e^{-s0(y_i - f0(x_i))^2} +$$

minima $$Z_{i1}\omega_1 N_1 e^{-s1(y_i - f1(x_i))^2} + Z_{i4}\omega_4 P_b] + C_k K^2 + C_s S^2 +$$

$$C_0(Y_{00} - Y_{01} - d_0)^2 + C_1(Y_{01} - d_1)^2 +$$

-continued $$C_2(Y_{02} - Y_{01} - d_2)^2 + C_3(Y_{03} - Y_{01} - d_3)^2$$

In our case, the auxiliary variables $Z_{ik}$ are discrete variable that determine the assignment of a maxima or minima point to one of the terms in the mixture (to one of the lines, or to the background). More precisely, to each minimum point is associated three binary variables $Z_{i0}$, $Z_{i1}$, and $Z_{i4}$, only one of which can be non-zero. For example, the values $Z_{i0}=1$, $Z_{i1}=0$, $Z_{i4}=0$ mean that minimum point i is assigned to descender line 60. The values $Z_{i0}=0$, $Z_{i1}=1$, $Z_{i4}=0$ mean that minimum point "i" is assigned to base line 62. The values $Z_{i2}=1$, $Z_{i3}=0$, $Z_{i4}=0$ mean that maxima point "i" is assigned to core line 64. The values $Z_{i2}=0$, $Z_{i3}=1$, $Z_{i4}=0$ mean that maxima point "i" is assigned to ascender line 66. When term $Z_{i4}=1$, point "i" is considered an "outlier" and is assigned to the background energy.

Because only one term in each mixture is non zero, the average of Q over $Z_{ik}$ is a simple quadratic function of K, S, $Y_{00}, Y_{01}, Y_{02}, Y_{03}$, of the form:

$$Q_{ave} = \sum_{i \, maxima} (<Z_{i2}> s_2(y_i - f_2(x_i))^2 + \qquad (3)$$

$$<Z_{i3}> s_3(y_i - f_3(x_i))^2 + C) +$$

$$\sum_{i \, minima} (<Z_{i0}> s_0(y_i - f_0(x_i))^2 + <Z_{i1}> s_1(y_i - f_1(x_i))^2 + C) +$$

$$C_0(Y_{00} - Y_{01} - d_0)^2 + C_1(Y_{01} - d_1)^2 + C_2(Y_{02} - Y_{01} - d_2)^2 +$$

$$C_3(Y_{03} - Y_{01} - d_3)^2 + C_k K^2 + C_s S^2$$

In the above equation, $<Z_{ik}>$ denotes the average of the binary variable $Z_{ik}$. The minimum of the function $Q_{ave}$ can easily be computed by equating its partial derivatives to zero.

$$\frac{\partial Q_{ave}}{\partial K} = 0; \frac{\partial Q_{ave}}{\partial S} = 0; \frac{\partial Q_{ave}}{\partial Y_{00}} = 0; \frac{\partial Q_{ave}}{\partial Y_{01}} = 0;$$

$$\frac{\partial Q_{ave}}{\partial Y_{02}} = 0; \frac{\partial Q_{ave}}{\partial Y_{03}} = 0;$$

Since $Q_{ave}$ is a quadratic function, setting the partial derivatives to zero permits solving for the variables K, S, $Y_{00}, Y_{01}, Y_{02}, Y_{03}$ using six linear simultaneous equations. The values for these variables obtained from the solution of the six equations are used to find new average values $<Z_{ik}>$ using the following formula:

$$<Z_{i3}> = \frac{\omega_3 N_3 e^{-s_3(y_i - f_3(x_i))^2}}{\omega_2 N_2 e^{-s_2(y_i - f_2(x_i))^2} + \omega_3 N_3 e^{-s_3(y_i - f_3(x_i))^2} + \omega_4 p_b}$$

$$<Z_{i2}> = \frac{\omega_2 N_2 e^{-s_2(y_i - f_2(x_i))^2}}{\omega_2 N_2 e^{-s_2(y_i - f_2(x_i))^2} + \omega_3 N_3 e^{-s_3(y_i - f_3(x_i))^2} + \omega_4 p_b}$$

$$<Z_{i1}> = \frac{\omega_1 N_1 e^{-s_1(y_i - f_1(x_i))^2}}{\omega_0 N_0 e^{-s_0(y_i - f_0(x_i))^2} + \omega_1 N_1 e^{-s_1(y_i - f_1(x_i))^2} + \omega_4 p_b}$$

$$<Z_{i0}> = \frac{\omega_0 N_0 e^{-s_0(y_i - f_0(x_i))^2}}{\omega_0 N_0 e^{-s_0(y_i - f_0(x_i))^2} + \omega_1 N_1 e^{-s_1(y_i - f_1(x_i))^2} + \omega_4 p_b}$$

($Z_{i4}$ does not need to be computed because it only enters in the constant terms in Equation (3)). New $<Z_{ik}>$ values are then substituted in Equation (3), and Equation (3) is minimized again to obtain a new set of values for variables K, S, $Y_{00}, Y_{01}, Y_{02}, Y_{03}$. This procedure is repeated a number of times, such as four or five, to obtain values for the variables K, S, $Y_{00}, Y_{01}, Y_{02}$ and $Y_{03}$ that minimize the energy function and thereby define lines 60 through 66, using Equation 1.

With regard to Equation 3, it should be noted that the repetitive nature of this calculation requires an initial value for $<Z_{ik}>$ and $f_n(x_i)$, or in other words, initial values for the variables K, S, $Y_{00}, Y_{01}, Y_{02}$ and $Y_{03}$. These initial values are obtained by first finding a center line that passes through the word of interest. In reference to FIG. 7 and recalling the normalization of the coordinate system as discussed with regard to equation 2, a center line is found by transforming the coordinates of the line represented by $$v_i = T x_i + y_c$$

using the relationship $$x_{i \, new} \leftarrow \frac{x_{i \, old}}{y_0}; \, y_{i \, new} \leftarrow \frac{y_{i \, old} - v_i}{y_0}.$$

This line is a single non-flexible line, such as line 82. The square root of the average, of the squared distances between each maxima and line 82, and each minima point and line 82 is calculated to obtain a value $\sigma$. The starting points for lines 60 through 66 are defined with respect to line 82 using the value $\sigma$. Line 62 is initially positioned at 1.0 $\sigma$ below line 82, line 64 is positioned at 1.0 $\sigma$ above line 82, line 66 is positioned 2 $\sigma$ above line 82 and line 60 is positioned 2 $\sigma$ below 82. From these starting positions, the initial values for variables K, S, $Y_{00}, Y_{01}, Y_{02}$ and $Y_{03}$ are obtained so that the initial values of $<Z_{ik}>$ may be calculated for the iterative calculation described above. These initial positions are also used as the "rest lengths" for the springs of FIG. 5 ($d_0$–$d_3$ in Equations 2 and 3). The value of $d_0$ is equal to the distance between the initial positions of line 60 and line 62. The value of $d_2$ is equal to the distance between the initial positions of lines 62 and 64. The value of $d_3$ is equal to the distance between the initial positions of lines 62 and 66. The value of $d_1$ is equal to the distance between the initial position of line 62 and the position of center line 82.

After determining the values for the variables K, S, $Y_{00}, Y_{01}, Y_{02}$ and $Y_{03}$ by minimizing the energy function of Equation 2, the input word may be standardized before being passed to preprocessor 34 which eventually passes its output to neural network 36 for eventual word or symbol identification.

The input word is standardized for use by preprocessor 34 by transforming the coordinates (x, y) of each point in the word to the coordinates (x', y') in accordance with Equation 5 where the variable h is equal to a predefined distance between base line 62 and core line 64 after standardization. The standardized word is then passed to preprocessor 34 which provides an output to neural network 36.

$$x' = \frac{h}{y_{03} - y_{01}} (x - x_0) \qquad (5)$$

$$y' = \frac{h}{y_{03} - y_{01}} (y - f_0(x))$$

where $$f_0(x) = K(x - X_0^2) - S(x - X_0) + Y_{00}.$$

Preprocessor 34 receives data describing the standardized word or symbol in question from standardizer 32. This data can be in a variety of forms; however, it typically is in the form $(x'_N, y'_N)$ which describes the horizontal and vertical position of the transformed points composing the word or symbol.

As an initial step in preprocessing, microprocessor 52 divides each line or curve composing the word or symbol into micro-segments based, for example, on the sample period of data collection device 30, where each sample represents an endpoint of a micro-segment. It is possible to base the micro-segments on any convenient sampling period by simply resampling the data provided by data collection device 30.

The micro-segments that make up the word or symbol are mapped into cells that compose an array which quantifies the features of the micro-segments. Each cell is assigned a value that is used as an input to neural network 36.

Figure 8:
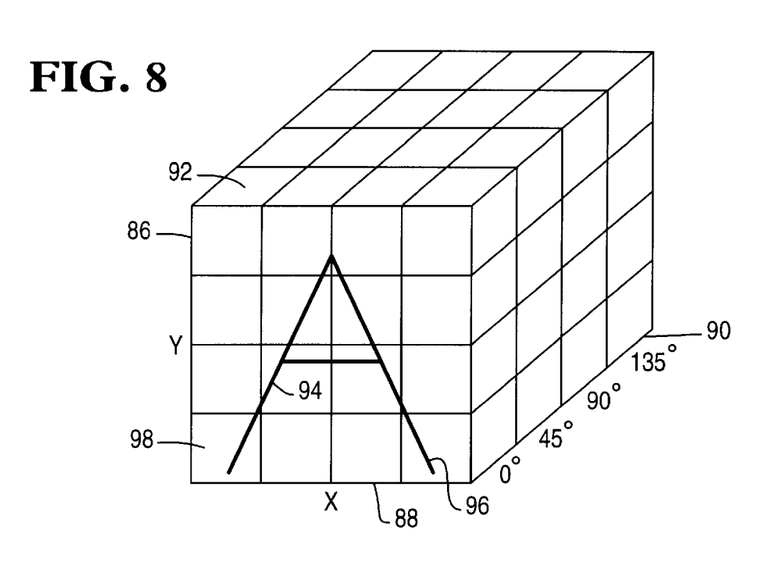
FIG. 8 illustrates a three-dimensional cellular array that quantifies the features of a micro-segment.

FIG. 8 illustrates a three-dimensional array that quantifies the features of the micro-segment. Note that the array is drawn as three dimensional for ease of visualization, and that the array can be implemented as a collection of locations in a memory. Axis 86 indicates the y position of a micro-segment, axis 88 indicates the x position of a micro-segment and axis 90 indicates the direction of the trajectory of a micro-segment. The three-dimensional array comprises sixty-four cells 92. In this example, axis 86 has been quantized into four cells that cover the y dimension of the symbol. Axis 88 has been quantized into four cells that cover the x dimension of the symbol. Axis 90 has been quantized into four cells that cover the possible trajectories for the micro-segments, that is, trajectories along a 0°/180° line, a 45°/225° line, a 90°/270° line and a 13°5/315° line. Each micro-segment composing a symbol is mapped into or associated with the cell that has a feature label which most closely matches the features of the micro-segment. In the illustration, the entire symbol "A" is shown in the 0° cellular plane for clarity. It should be understood that leg 94 should be in the 45° cellular plane and leg 96 should be in the 135° cellular plane.

Other three-dimensional arrays may be used. Each axis can be assigned to any micro-segment feature and each dimension can be quantized into any number of cells. It is preferable to use a three-dimensional array comprising a first axis with six cells that indicate a micro-segment's x position, a second axis with six cells that indicate a micro-segment's y position, and a third axis with four cells that indicate a micro-segment's trajectory direction.

It is also possible to map or associate a micro-segment with more than one cell. For example, if axis 90 was defined as the cosine of the angle between the micro-segment's trajectory and the trajectory lines listed along axis 90, the entire symbol "A" would be in each of the cellular planes along axis 90.

A three-dimensional array was used as an example; however, an array can be constructed using any number of dimensions. For example, a five-dimensional array can be used by assigning an axis to the micro-segment's x position, y position, trajectory, curvature and pen speed.

In some situations, there may be correlations between the features of a sequence of micro-segments. In the case of handwritten words, the time and x coordinate typically increase simultaneously. This results in an inefficient use of cells because only the cells which are near a diagonal in the array's x-t plane are populated. This problem is avoided by transforming the coordinate system so that the correlations between the features of the sequence of micro-segments are minimized. This is accomplished using known techniques such as a principal axis transform (also known as a Karhunen-Loeve transform) or Kohonen's topological map algorithm to distribute the micro-segments within the array. The Kohonen algorithm is described in Kohonen, T. "Self-Organized Formation of Topologically Correct Feature Maps," *Biological Cybernetics*, Vol. 43, pages 59–69, 1982.

Figure 9:
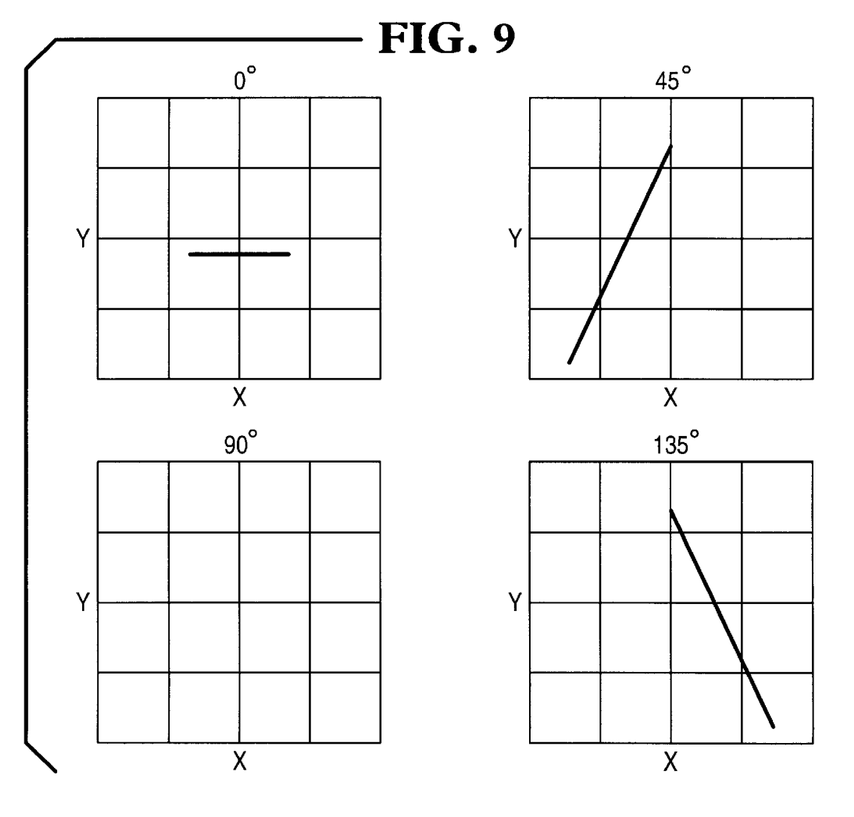
FIG. 9 illustrates the three-dimensional array of FIG. 8 represented as four 4×4 cellular array planes.

FIG. 9 illustrates the array of FIG. 8 in a different format. This format consists of four two-dimensional cellular arrays where each of the four planar arrays correspond to a different trajectory from axis 90 of FIG. 8. Each planar array has a y and x axis that describes the position of the micro-segments. In this example, each planar array contains 16 cells so that a total of 64 cells are presented to the input of neural network 36.

Figure 10:
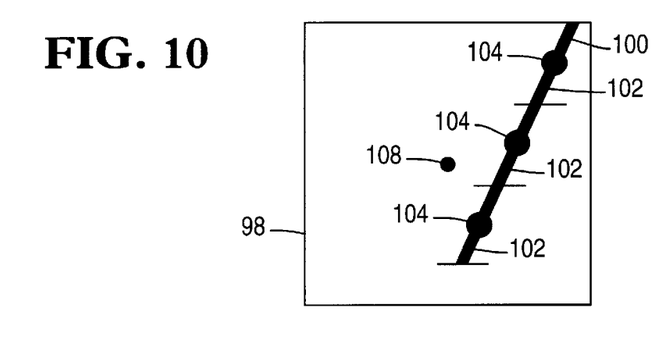
FIG. 10 illustrates one cell of the array in FIG. 8.

FIG. 10 is an enlarged view of cell 98 of FIG. 8. Line 100 is the portion of the symbol "A" that is contained in cell 98. Line 100 comprises micro-segments 102, with each micro-segment having a center point 104. The horizontal lines on line 100 indicate the boundaries between micro-segments. The feature label or center of cell 98 is represented by point 108. The value assigned to cell 98, which is provided to neural network 36, is based on how closely each micro-segment in cell 98 corresponds to the center of cell 98, and on the length and number of micro-segments in cell 98.

In determining the value of a cell, a value should be assigned to each micro-segment associated with the cell. The value of a micro-segment is determined by the micro-segment's distance from the center of the cell. This distance is measured from the center point of the cell to the center point of the micro-segment. The further that the center of the micro-segment is from the center of the cell, the lower the value that is assigned to that micro-segment. (It is also possible to assign higher values, but it is more convenient to use lower values). This decrease in value can be a linear function or any other convenient function. For example, in assigning a value to a micro-segment based on its two-dimensional distance from a center point of a cell, a two-dimensional Gaussian function can be used. It is also possible to use trigonometric functions. For example, cell 98's center for the trajectory dimension is represented by the 0°/180° line. The value of a micro-segment can be decreased based on the cosine of the angle between the 0°/180° line and the actual direction of the trajectory of the micro-segment. A multitude of other functions such as bell-shape functions, Mexican hat functions, difference of Gaussians or a spline may also be used.

A micro-segment's distance from the center of the cell can be treated separately for each dimension. For example, a Gaussian decrease in value can be used for the x direction, a linear decrease in value can be used for the y direction and a cosine reduction in value can be used for the trajectory dimension.

It is also possible to decrease the value of a micro-segment using a single multi-dimensional function such as a multi-dimensional Gaussian.

If separate functions are used to decrease a micro-segment's value, the reductions in value obtained for each dimension can be combined using a summation, product or other functions.

A value assigned to a micro-segment may be modified using a factor based on the length of the micro-segment. For example, longer micro-segments may be given more weight than shorter micro-segments.

The value of the cell that is provided to neural network 36 is obtained by summing the values assigned to the micro-segments mapped into the cell. For example, in a situation where a micro-segment's x - y value is determined with a two-dimensional Gaussian function of the micro-segment's x - y distance from the cell's x - y center, $(\Delta \times \Delta)$ and where a micro-segment's trajectory angle value is determined with a cosine function of the angle between the micro-segment's trajectory and the cell's trajectory center $(\Delta \Sigma)$, the cell value C can be expressed by the following equation where the summation is performed over the N micro-segments within the cell and where the factor $L_i$ is based on the length of micro-segment i.

$$C=\Sigma_i^N(\cos(\Delta\Theta)\text{Gaussian}(\Delta x, \Delta y)L_i)_i$$

Figure 11:
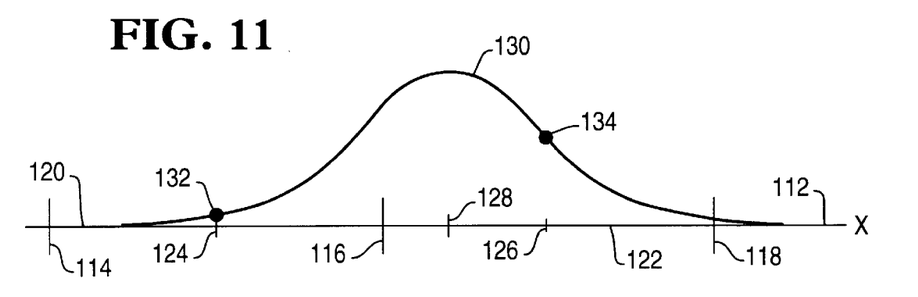
FIG. 11 illustrates a spreading function used in the x dimension.

The value of a cell may also be affected by micro-segments in other cells. FIG. 11 illustrates a spreading function which affects the value of cells based on a micro-segment that is contained in another cell. In this example, a micro-segment's position in the x dimension is used to determine the value of the cell in which the micro-segment is contained and the value of an adjacent cell. Axis 112 indicates the x dimension, and positions 114, 116 and 118 indicate the boundaries between adjacent cells in the x dimension. Cell 120 is bounded by the values of x at positions 114 and 116, and cell 122 is bounded by the values of x at positions 116 and 118. The x dimension center for cell 120 is indicated by position 124 and the x dimension center for cell 122 is indicated by position 126. Cell 122 contains a micro-segment that has its x dimension center at position 128. A spreading function indicated by curve 130 is used to assign values to the micro-segment in cell 122. In this example, the micro-segment in cell 122 is assigned two values. The first value is used in determining the value of cell 120 and the second value is used in determining the value of cell 122. The first value of the micro-segment is based on the distance between positions 128 and 124. Point 132 on curve 130 indicates the first value that the spreading function assigns to the micro-segment. The second value of the micro-segment is based on the distance between positions 128 and 126. Point 134 on curve 130 indicates the second value that the spreading function assigns to the micro-segment. The first value which corresponds to point 132 on curve 130 is used in determining the value of cell 120, and the second value which corresponds to point 134 on curve 130 is used in determining the value of cell 122.

Other spreading functions may be used such as a spreading function that affects more than two cells, or spreading functions that assign negative values to micro-segments.

Figure 12:
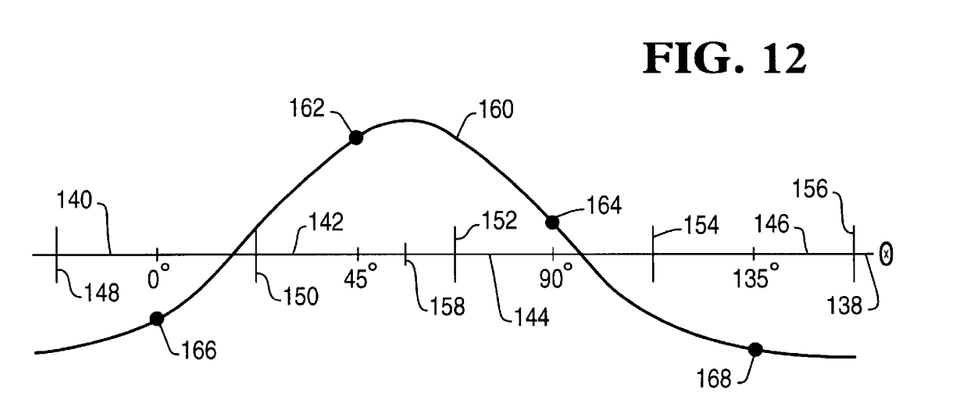
FIG. 12 illustrates a spreading function used in the Θ dimension.

FIG. 12 illustrates a spreading function that assigns both positive and negative values to a micro-segment. Axis 138 indicates the trajectory angle $\Theta$ of a micro-segment. The $\Theta$ dimension is broken into cells 140, 142, 144 and 146. Cell 140 has a $\Theta$ dimension center of 0 degrees and its boundaries are indicated by positions 148 and 150. Cell 142 has a $\Theta$ dimension center of 45 degrees and its boundaries are indicated by positions 150 and 152. Cell 144 has a $\Theta$ dimension center of 90 degrees and its boundaries are indicated by positions 152 and 154. Cell 146 has a $\Theta$ dimension center of 135 degrees and its boundaries are indicated by positions 154 and 156. A micro-segment in cell 142 has a trajectory along the 55 degree trajectory and is indicated by position 158. This micro-segment is used in determining the value of cells 140, 142, 144 and 146 even though the micro-segment is only located in cell 142. A spreading function indicated by curve 160 is used to assign values to the micro-segment based on the $\Theta$ dimension distances between the micro-segment and the center of cells 140, 142, 144 and 146. These assigned values are used in determining the values of the cells. Point 162 on curve 160 assigns the micro-segment a value that is used in determining the value of cell 142. Point 164 on curve 160 assigns the micro-segment a value that is used in determining the value of cell 144. Point 166 on curve 160 assigns the micro-segment a negative value that is used in determining the value of cell 140. Point 168 on curve 160 assigns the micro-segment a negative value that is used in determining the value of cell 146.

Any variety of spreading functions can be used to assign values to the micro-segments. The spreading functions can be limited to assigning a single value to a micro-segment that acts within one or more cells, or they may assign a plurality of values that act within one or more cells. These values may be negative or positive and can be defined using finctions such as Gaussian functions, trigonometric functions, bell-shape functions, Mexican hat functions, difference of Gaussians or a spline.

The overall value assigned to each cell is used as an input to a classifier. Classifiers such as associative memories, neural networks, linear classifiers, polynomial classifiers, nearest neighbor classifiers, or vector quantizers can be used to identify a symbol based on the cell values.

Figure 13:
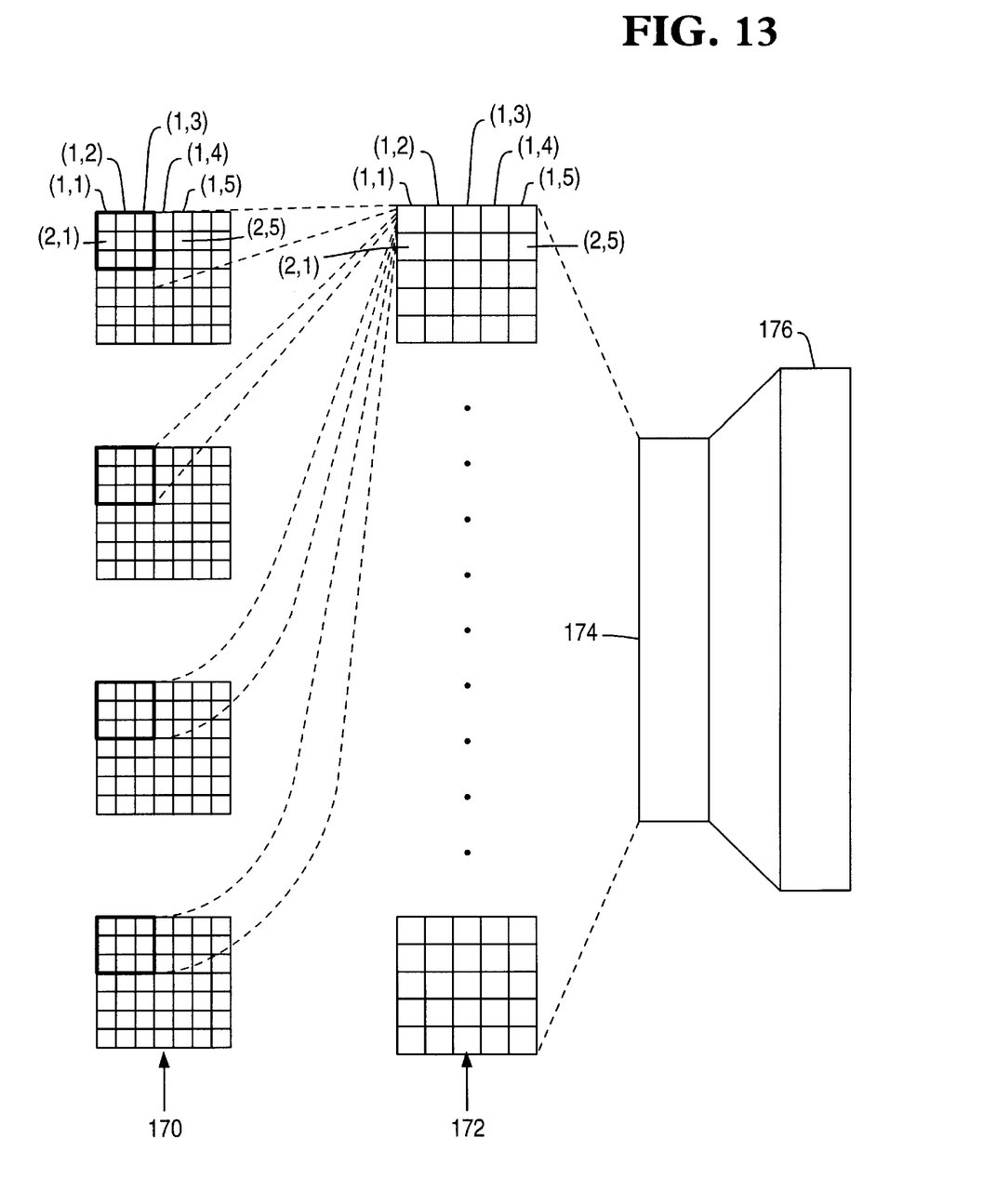
FIG. 13 represents a neural network.

FIG. 13 represents a neural network. The neural network comprises layers 172, 174 and 176. The cells of arrays 170 contain the cell values that are the inputs to the neural network. In this example, a three-dimensional cellular array was used to quantify the features of the micro-segments. Both the x and y dimensions were quantized into seven cells each, and the trajectory angle dimension was quantized into four cells. The three-dimensional array is represented as four 7×7 two-dimensional cellular arrays where each of the four planar arrays correspond to a different trajectory angle.

Layer 172 of the neural network receives its inputs from arrays 170. Layer 172 comprises eight groups of neurons where each group of neurons is arranged in a 5×5 matrix. This neural network is called a convolution neural network because all of the neurons in each group of layer 172 use the same set of coefficients or weights to modify the inputs received from the cells of arrays 170; however, each of the eight groups of layer 172 use different sets of coefficients.

Each neuron in layer 172 receives a total of thirty-seven inputs. The thirty-seven inputs comprise a bias input and nine inputs from each of arrays 170. The bias input is simply an input that has a value of one which is modified by a bias coefficient or weight. The neuron at position (1,1) in each of the groups of layer 172 receives inputs from four 3×3 blocks of cells or receptive fields that have an upper left hand corner at position (1,1) in their respective arrays. The neuron at position (1,2) in each of the groups of layer 172 receives inputs from four receptive fields that have an upper left hand corner at position (1,2) in their respective arrays. Neurons at positions (1,3) through (1,5) in each of the groups of layer 172 similarly receive inputs from four receptive fields that have an upper left hand corner at positions (1,3) through (1,5), respectively. Each row of neurons in layer 172 is connected similarly. For example, the neurons at positions (2,1) through (2,5) in each of the groups of layer 172 receive inputs from four receptive fields that have an upper left hand corner at position (2,1) to (2,5), respectively.

The output of each neuron of layer 172 is connected to each neuron of layer 174 that is, layers 172 and 174, are fully connected. Layer 174 has 30 neurons.

The output of the neurons of layer 174 are fully connected to the neurons of layer 176. The number of neurons in layer 176 is based on the number of words, groups of symbols, symbols or characters in the set of words, groups of symbols, symbols or characters to be recognized.

Neural networks of this type and similar networks are known in the art. Neural networks are discussed in U.S. Pat. No. 5,067,164 "Hierarchical Constrained Automatic Learning Neural Network for Character Recognition" and U.S. Pat. No. 5,058,179 "Hierarchical Constrained Automatic Learning Network for Character Recognition". Other neural network arrangements may also be used to perform symbol recognition.

Methods for training neural networks are well known. Publications such as "Parallel Distributed Processing" by Rumelhart, et al, (Bradford Books: Cambridge, Mass. 1986) discuss methods for training this type of neural network.

In applications that involve large or complex word or symbol sets, it may be advantageous to use several classifiers to identify words or symbols.

When preprocessor 34 receives a standardized word from word standardizer 32 it is preferable that the preprocessor use a cellular array that is 14 cells high by a variable width. The variable width is chosen to provide sufficient space to accept the largest word expected.

Figure 14:
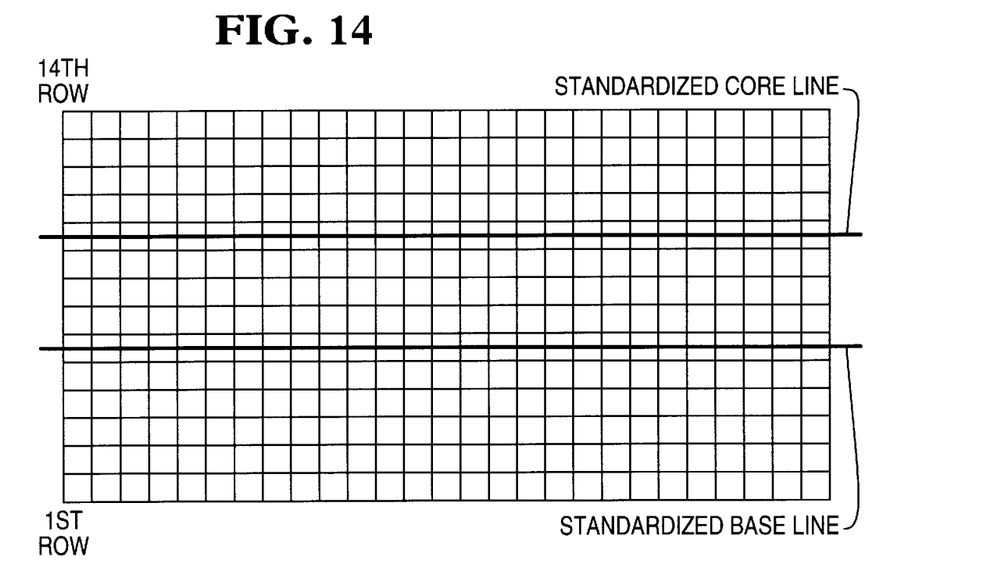
FIG. 14 illustrates a preferred relationship between the preprocessor's array and the standardized base and core lines.

In reference to FIG. 14, the standardized core line and the standardized base line are aligned with the cells of the preprocessor's cellular array so that the core line passes through the center of the 10th row of cells and the base line passes through the center of the 6th row of cells. The distance between the centers of the 10th row of cells and the 6th row of cells corresponds to the variable "h" in Equation 5. It is also possible to align the base and core lines with other cells.

Figure 15:
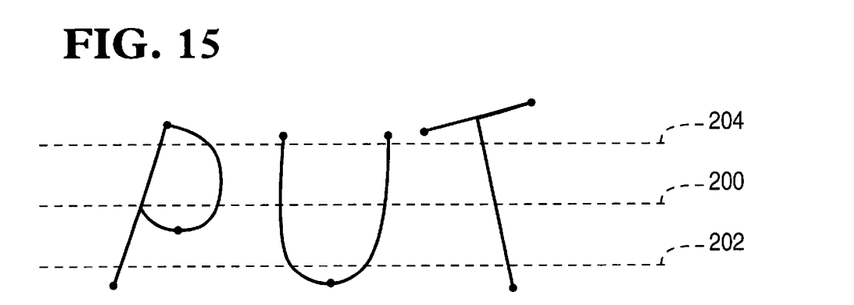
FIG. 15 illustrates base and core lines before fitting.

It is possible to use two lines rather than four lines to standardize a word when, for example, only uppercase characters or digits compose the word or symbol string.

$$i \quad y = f_n(x) = K(x-X_0)^2 + S(x-X_0) + Y_{0n}; \qquad (6)$$

where n=1 or 2 for lines 202 and 204, respectively. In this situation, an initial center line is determined as discussed with regard to FIG. 7. In reference to FIG. 15, center line 200 is calculated and then initial base line 202 is calculated as one σ below line 200 and initial ascender line 204 is calculated as one σ above line 200 as was discussed with regard to FIG. 7. Using these starting points, the initial values of K, S, $Y_{01}$, and $Y_{02}$ are calculated. The values of $d_1$ and $d_2$ are also obtained from the starting points. The value of $d_1$ is equal to the distance between the initial position of line 202 and line 200. The value of $d_2$ is equal to the distance between the initial positions of lines 202 and 204. The initial value of $<Z_{ik}>$ is then calculated in accordance with Equation 7.

$$<Z_{i1}> = \frac{\omega_1 N_1 e^{-s_1(y_i - f_1(x_i))^2}}{\omega_1 N_1 e^{-s_1(y_i - f_1(x_i))^2} + \omega_4 p_b} \qquad (7)$$

$$<Z_{i2}> = \frac{\omega_2 N_2 e^{-s_2(y_i - f_2(x_i))^2}}{\omega_2 N_2 e^{-s_2(y_i - f_2(x_i))^2} + \omega_4 p_b}$$

The values of $<Z_{ik}>$ are then used in accordance with Equation 8 to minimize $Q_{ave}$ of Equation 8 in the same iterative manner as $Q_{ave}$ of Equation 3.

$$Q_{ave} = \sum_{\substack{i \\ \text{maxima}}} (<Z_{i2}>s_2(y_i - f_2(x_i))^2 + C) + \qquad (8)$$

$$\sum_{\substack{i \\ \text{maxima}}} (<Z_{i1}>s_1(y_i - f_1(x_i))^2 + C) +$$

$$C_0(Y_{00} - Y_{01} - d_0)^2 + C_1(Y_{01} - d_1)^2 + C_2(\times Y_{02} - Y_{01} - d_2)^2 +$$

$$C_3(Y_{03} - Y_{01} - d_3)^2 + C_k K^2 + C_s S^2$$

where $$N_k = \sqrt{\frac{s_k}{\pi}},$$

where $C_1=3$, $C_2=50$, $C_K=200$, $C_S=12.5$, $\omega_1=0.9$, $\omega_2=0.9$, $\omega_4 p_b=0.1$, $s_1=2$, $s_2=2$, and where the coordinate system has been normalized as discussed with regard to Equation 2. The input word is standardized by transforming the coordinates (x, y) of each point in the word to the coordinates (x', y') in accordance with Equation 9 where the variable h is equal to the predefined distance between base line 202 and core line 204 after standardization.

$$x' = \frac{2h}{y_{03} - y_{01}} (x - x_0) \qquad (9)$$

$$y' = \frac{2h}{y_{03} - y_{01}} (y - f_0(x))$$

In reference to FIG. 14, the standardized core line and the standardized base line are aligned with the cells of the preprocessor's cellular array so that the core line passes through the center of the 10th row of cells and the base line passes through the center of the 6th row of cells. The distance between the centers of the 10th row of cells and the 6th row of cells corresponds to the variable "h" in Equation 9.

Figure 16:
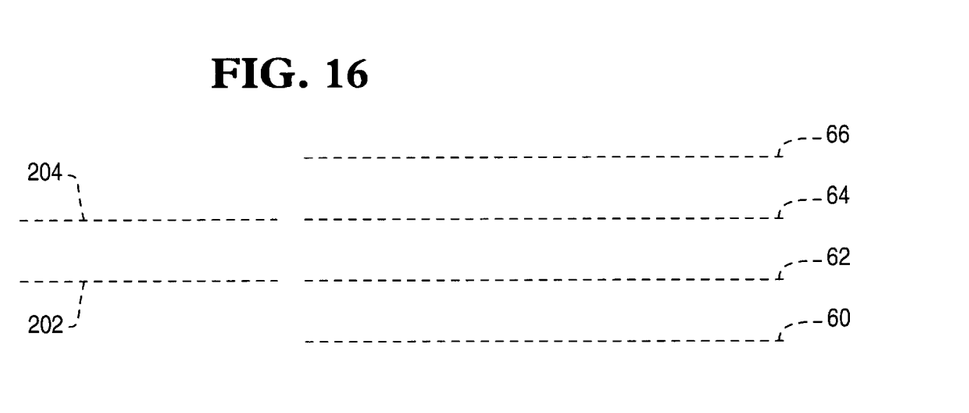
FIG. 16 illustrates a relationship between a two line and four line standardization.

It may be desirable to use the two line model to determine the initial positions of the lines in the four line model. FIG. 16 illustrates how the two line model may be used as a starting point for the four line model. Lines 202 and 204 represent the lines obtained from the two line model, and lines 60, 62, 64 and 66 are used in the four line model. Line 62 is initialized at the same level as line 202, and line 64 is initialized at the same level as line 204. Line 66 is initialized above line 64 at a distance from line 64 that is equal to the distance between lines 64 and 62. Line 60 is initialized below line 62 at a distance from line 62 that is equal to the distance between lines 64 and 62. These initial levels are also used as the "rest lengths" for the springs of FIG. 5 ($d_0$–$d_3$ in Equation 2). Using this relationship, the initial values for K, S, $Y_{00}$, $Y_{01}$, $Y_{02}$ and $Y_{03}$ are calculated and lines 60–66 are fitted to the word as discussed above.

I claim:

1. An apparatus for recognizing groups of symbols, comprising:

standardizing means for standardizing a group of symbols where each symbol in said group has a plurality of points each described by a set of coordinates, said standardizing means standardizing said group of symbols to form a standardized group of symbols by transforming said coordinates of said points into transformed coordinates using a set of characteristics of a plurality of curves fitted to said points, a first curve belonging to said plurality of curves being fitted to maxima points belonging to said plurality of points, said first curve being fitted to said maxima points by minimizing a first cost where said first cost increases with said first curve's distance from said maxima points;

wherein said standardizing means fits said plurality of curves to said points by fitting a second curve belonging to said plurality of curves to said maxima points, said second curve being fitted to said maxima points by minimizing a second cost where said second cost increases with said second curve's distance from said maxima points and by minimizing a third cost where said third cost increases with a displacement in spacing between said plurality of curves; and classifier means that receives an input representative of said standardized group of symbols for recognizing said group of symbols.

2. The apparatus of claim 1, wherein said standardizing means fits said plurality of curves to said points while attempting to minimize a slant of said curves.

3. The apparatus of claim 1, wherein said standardizing means fits said plurality of curves to said points while attempting to minimize a curvature of said curves.

4. The apparatus of claim 1, wherein said standardizing means fits said plurality of curves to said points by fitting a second curve belonging to said plurality of curves to minima points belonging to said plurality of points, said second curve being fitted to said minima points by minimizing a second cost where said second cost increases with said second curve's distance from said minima points.

5. The apparatus of claim 1, further comprising:

preprocessor means responsive to an applied plurality of micro-segments which describes said standardized group of symbols, for associating a micro-segment with a plurality of cells of a feature cellular array, where each of said cells has an associated feature label, and for assigning a cell value to a cell, using a micro-segment value that is related to how well a feature of said micro-segment associated with said cell corresponds to said cell's feature label; and wherein said classifier means receives cell values assigned to said plurality of cells for recognizing said group of symbols.

6. An apparatus for recognizing groups of symbols, comprising:

standardizing means for standardizing a group of symbols where each symbol in said group has a plurality of points each described by a set of coordinates, said standardizing means standardizing said group of symbols to form a standardized group of symbols by transforming said coordinates of said points into transformed coordinates using a set of characteristics of a plurality of curves fitted to said points, a first curve belonging to said plurality of curves being fitted to minima points belonging to said plurality of points, said first curve being fitted to said minima points by minimizing a first cost where said first cost increases with said first curve's distance from said minima points;

wherein said standardizing means fits said plurality of curves to said points by fitting a second curve belonging to said plurality of curves to said minima points, said second curve being fitted to said minima points by minimizing a second cost where said second cost increases with said second curve's distance from said minima points and by minimizing a third cost where said third cost increases with a displacement in spacing between said plurality of curves; and classifier means that receives an input representative of said standardized group of symbols for recognizing said group of symbols.

7. The apparatus of claim 6, wherein said standardizing means fits said plurality of curves to said points while attempting to minimize a curvature of said curves.

8. The apparatus of claim 6, wherein said standardizing means fits said plurality of curves to said points while attempting to minimize a slant of said curves.

9. The apparatus of claim 6, further comprising:

preprocessor means responsive to an applied plurality of micro-segments which describes said standardized group of symbols, for associating a micro-segment with a plurality of cells of a feature cellular array, where each of said cells has an associated feature label, and for assigning a cell value to a cell, using a micro-segment value that is related to how well a feature of said micro-segment associated with said cell corresponds to said cell's feature label; and wherein said classifier means receives cell values assigned to said plurality of cells for recognizing said group of symbols.

10. An apparatus for recognizing groups of symbols, comprising:

standardizing means for standardizing a group of symbols where each symbol in said group has a plurality of points each described by a set of coordinates, said standardizing means standardizing said group of symbols to form a standardized group of symbols by transforming said coordinates of said points into transformed coordinates using a set of characteristics of a plurality of curves fitted to said points, a first curve and a second curve belonging to said plurality of curves being fitted to minima points belonging to said plurality of points, and a third curve and a fourth curve belonging to said plurality of curves being fitted to maxima points belonging to said plurality of points, where said first, second, third and fourth curves are fitted to said points by minimizing a first, a second, a third and a fourth cost while minimizing a displacement in spacing between said plurality of curves, and where said first cost increases with said first curve's distance from said minima points, said second cost increases with said second curve's distance from said minima points, said third cost increases with said third curve's distance from said maxima points and said fourth cost increases with said fourth curve's distance from said maxima points; and classifier means that receives an input representative of said standardized group of symbols for recognizing said group of symbols.

11. The apparatus of claim 10, wherein said standardizing means fits said plurality of curves to said points while attempting to minimize a slant of said curves.

12. The apparatus of claim 10, wherein said standardizing means fits said plurality of curves to said points while attempting to minimize a curvature of said curves.

13. The apparatus of claim 10, further comprising:

preprocessor means responsive to an applied plurality of micro-segments which describes said standardized group of symbols, for associating a micro-segment with a plurality of cells of a feature cellular array, where each of said cells has an associated feature label, and for assigning a cell value to a cell, using a micro-segment value that is related to how well a feature of said micro-segment associated with said cell corresponds to said cell's feature label; and wherein said classifier means receives cell values assigned to said plurality of cells for recognizing said group of symbols.

* * * * *